United States Patent [19]
Warren

[11] Patent Number: 5,775,078
[45] Date of Patent: Jul. 7, 1998

[54] ROTARY LAWN MOWER

[76] Inventor: Richard C. Warren, 1293 Calumet Ave., West St. Paul, Minn. 55118

[21] Appl. No.: 684,526

[22] Filed: Jul. 19, 1996

[51] Int. Cl.⁶ .................................................. A01D 55/18
[52] U.S. Cl. .......................... 56/255; 56/17.5; 56/295
[58] Field of Search ...................... 56/17.5, 255, 295, 56/DIG. 9, DIG. 17, 17.3, DIG. 20

[56] References Cited

U.S. PATENT DOCUMENTS

| | | |
|---|---|---|
| 3,014,330 | 12/1961 | Oberdick .................... 56/25.4 |
| 3,109,275 | 11/1963 | Dunlap et al. ................ 56/295 |
| 4,214,426 | 7/1980 | Lindblad ...................... 56/295 |
| 4,257,214 | 3/1981 | Ferguson et al. ............ 56/295 X |
| 4,578,938 | 4/1986 | Genesco ....................... 56/295 |
| 4,922,697 | 5/1990 | Paiva et al. .................. 56/295 |
| 4,951,449 | 8/1990 | Thorud .......................... 56/2 |
| 4,977,735 | 12/1990 | Davis ............................ 56/295 |
| 5,094,066 | 3/1992 | McBride et al. ............. 56/295 |
| 5,109,656 | 5/1992 | Zimmer ....................... 56/295 X |

OTHER PUBLICATIONS

Toro Parts Calatog—Guardian® 72" Recycler®—p. 7, Form No. 3315–602A, Copyright 1992, Rev. 1993.
Toro Parts Catalog—Groundsmaster® 455D—pp. 78–80, Form No. 3316–247 Rev. A, Copyright 1994.

*Primary Examiner*—Terry Lee Melius
*Assistant Examiner*—Robert Pezzuto
*Attorney, Agent, or Firm*—Larkin, Hoffman, Daly & Lindgren, Ltd.

[57] ABSTRACT

A rotary mower (42) suitable for mowing ground vegetation including a cutting system (76) having a cutting deck (105). Mounted beneath the cutting deck (105) is a plurality of rotatable cutting blades (16), wherein each cutting blade (16) comprises a central portion (60) and first and second spaced apart tip portions (62a, b), wherein each tip portion (62) comprises a leading edge (56) having a sharpened cutting surface (64) for cutting the vegetation, a trailing edge (58), and an extending surface or "sail" (70) generally extending from the tip portion (62), whereby the sail (70a) of the first tip portion (62a) is different from than the sail (70b) of the second tip portion (62b).

11 Claims, 2 Drawing Sheets

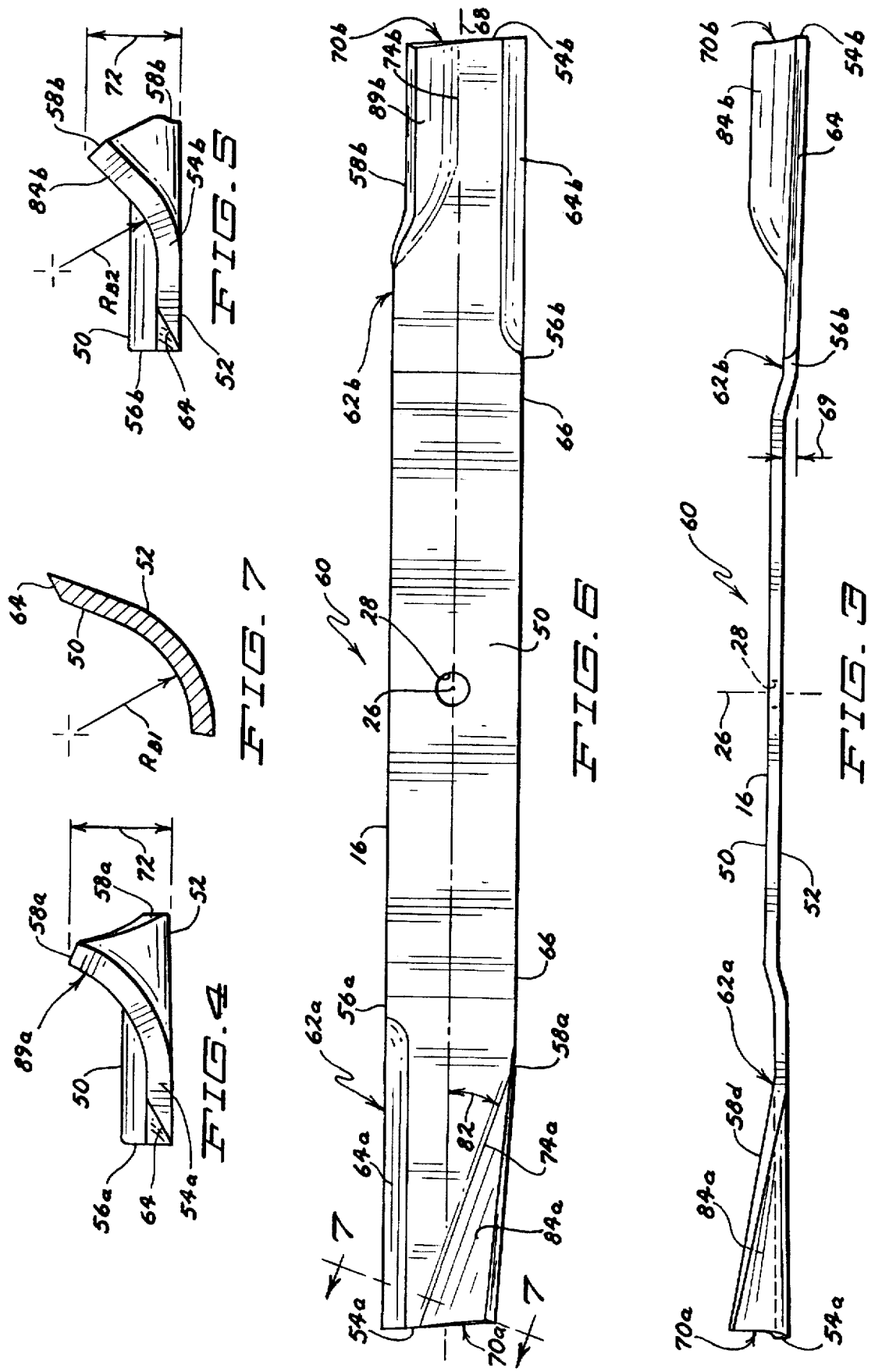

ROTARY LAWN MOWER

TECHNICAL FIELD

The present invention generally relates to rotary lawn mowers and to cutting blades for rotary lawn mowers. More particularly, this invention relates to a cutting blade having improved end sections, which increases the effectiveness and efficiency of the mower.

BACKGROUND OF THE INVENTION

Rotary mowers are widely used for cutting vegetation, in both commercial and consumer applications. Such rotary mowers typically include a rigid mower deck or housing and one or more associated cutting blades each rotating about a substantially vertical axis. Cutting blades may typically be operatively rotated directly from the output shaft of an engine or hydraulic motor or through an arrangement of belts and pulleys.

Rotary cutting blades are often elongated in shape, having a central portion and outer end portions. A longitudinal axis generally extends lengthwise through the central and outer end portions. Each end portion generally includes a cutting edge extending along a blade side from an outer blade tip inwardly toward the central portion. Each end portion may also include an extending surface disposed on the opposite side of the blade from the corresponding cutting edge to improve blade performance. Many designs and orientations of such extending surfaces (some commonly referred to as "sails") exist. Popular "sail" styles include rectangular and triangular shapes, such as those incorporated in rotary cutting blades no. 86-0010 and 85-6040, respectively, manufactured by The Toro Company, assignee herein. A particularly configured triangular sail rotary blade is disclosed in U.S. Pat. No. 4,951,449 to Thorud, assigned to The Toro Company. Other sails may include more complex surface geometry. Most importantly, on known prior art cutting blades the extending surfaces or sails of opposing outer end portions are substantially identically formed. That is, transecting a typical prior art cutting blade through the blade center and in a plane perpendicular to the longitudinal axis would leave one with two virtually identical blade halves.

It is well recognized that the performance of rotary mowers is complexly influenced by the design of the mower housing and cutting blade(s). Cooperation between the mower housing and cutting blade is generally required to optimize the mower performance and aftercut lawn appearance. Particularly important to mower performance and aftercut lawn appearance is the configuration of the rotary cutting blade. Much prior art exists disclosing designs and geometries of rotary cutting blades, including many cutting blades which incorporate specific extending surface or "sail" geometry.

In many cases, the choice of extending surface or sail geometry is dictated by the design and application of the mower. For example, rotary cutting blades with relatively large rectangular sails may provide greater lift to grass clippings than other sails, and thus may find particular applicability in discharge collection mowers where the grass clippings are transferred from the housing into a collection bag or basket. As another example, rotary blades with triangular sails, as disclosed in U.S. Pat. No. 4,951,449, may find particular applicability in mulching mowers, where grass clippings are recirculated and recut within the housing prior to discharge. Still other rotary cutting blades include sails that are configured to optimize a side or rear discharge mowing operation, where it is desired that grass clippings exit the housing and be evenly dispersed from the mower.

Whether incorporating rectangular, triangular, or even more complex extending surfaces, known prior art rotary cutting blades each have substantially similar extending surfaces or sails on opposite ends thereof. The sail portion of a first end of a typical elongate rotary cutting blade is substantially duplicated at a second end of the blade. The benefits accompanying a rotary cutting blade including substantially different extending sails have heretofore been unrecognized by those skilled in the art. The Applicant has found that by including a combination of extending surface or sail configurations on the outer end portions of a cutting blade improvements in cutting effectiveness and efficiency may be made. No prior art arrangement is known which recognizes the benefits of devices within the scope of the present invention.

SUMMARY

Accordingly, one aspect of the present invention includes a rotary mower, including a cutting blade which is rotatable about a substantially vertical axis, and which includes a central portion and a plurality of outer end portions, wherein each outer end portion includes a cutting edge and an extending surface or "sail", and wherein at least one of the sails is substantially dissimilar in configuration to another one of the sails. One embodiment of the present invention provides that the cutting blade is generally elongate in shape having opposite outer end portions, wherein the extending surfaces or "sails" of the opposite outer end portions are substantially dissimilar in configuration. Another embodiment of the present invention provides that the cutting blade is generally elongate in shape and having first and second outer end portions each having an associated extending surface, wherein each extending surface upwardly transitions from the blade along a transition line, and wherein the transition lines of the first and second outer end portions are non-parallel. Yet another embodiment of the present invention provides that the cutting blade is generally elongate in shape and having first and second outer end portions, wherein the extending surface or "sail" of the first end portion is generally triangular in configuration, and wherein the extending surface or "sail" of the second end portion is generally rectangular in configuration.

BRIEF DESCRIPTION OF THE DRAWINGS

The invention will be further described with reference to the Drawings, wherein:

FIG. 3 is a side elevational view of a mower blade according to the present invention.

FIG. 4 is a left side elevational view of the blade shown in FIG. 3.

FIG. 5 is a right side elevational view of the blade shown in FIG. 3.

FIG. 6 is a top plan view of the blade shown in FIG. 3.

FIG. 7 is a cross-sectional view taken along line 7—7 of FIG. 6.

DETAILED DESCRIPTION OF A PREFERRED EMBODIMENT

Figure 1:
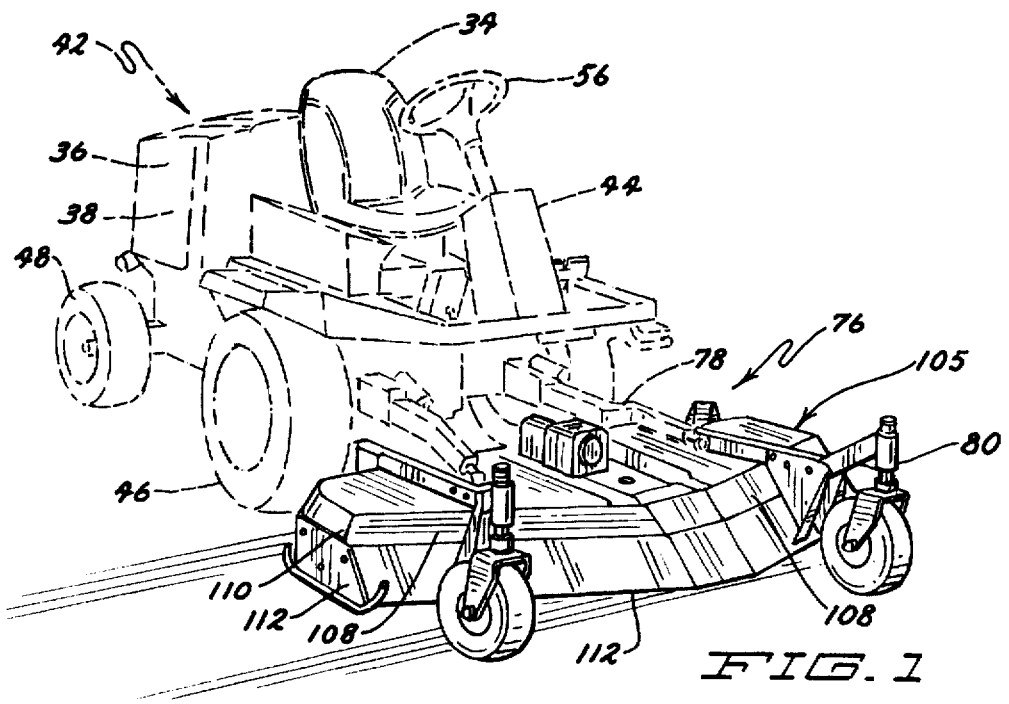
FIG. 1 is a perspective view of a mower according to the present invention, particularly showing the cutting system.

Referring now to the Drawings, wherein like reference numerals designate like parts and assemblies throughout the several views, and particularly referring to FIG. 1, there is shown a turf maintenance machine 42 of the type with which the invention herein is particularly useful. Such a mowing machine 42 is typically utilized for cutting relatively large areas such as parks and golf courses. Machine 42 is a preferred, though not exclusive, embodiment of the invention.

Referring again to FIG. 1, the mowing machine 42 includes a traction unit 44 which includes a rear housing 36 enclosing an engine 38 which is coupled via a transmission (not shown) to a pair of front drive wheels 46. The operator sits in a seat 34 positioned in front of the engine housing 36 and controls the operation of the machine 42 by means of hand and foot controls (not shown) and a steering wheel 56 which is coupled to a pair of rear steering wheels 48. The rear wheels 48 are generally smaller in both diameter and tread width for purposes of better maneuverability. A roll bar (not shown) may be provided for increased safety. Alternatively, traction unit 44 could comprise other riding or walk-behind mower configurations, e.g., a large, self-propelled, walk behind lawn mower (not shown) typically known in the art as a wide area mower or WAM.

A cutting system 76 incorporating the invention is positioned in front of the machine 42. Cutting system 76 includes a cutting deck 105 having a horizontally extending top wall 110, generally vertically extending side walls 112 defining a peripheral skirt extending downwardly from and around the periphery of top wall 110, and a rear discharge outlet 114 opening from the skirt. A protective cover 108 substantially encloses the region immediately above the top wall 110 of cutting deck 105, this region including a blade drive system (not shown) typically including belts and pulleys for transferring and distributing power to the cutting blades 16, discussed below.

Cutting system 76 is mounted on outer ends of two support arms 78 which provide means for raising and lowering the cutting system 76 and for further transferring motive force to propel the cutting system 76 across the turf. Castor wheels 80 are forwardly positioned with respect to the cutting system 76, and together with support arms 78 support the entire cutting system 76 during mowing operation. Conventional means (not shown) are provided on deck 105 for adjusting the height of deck 105 from a maximum to a minimum.

Figure 2:
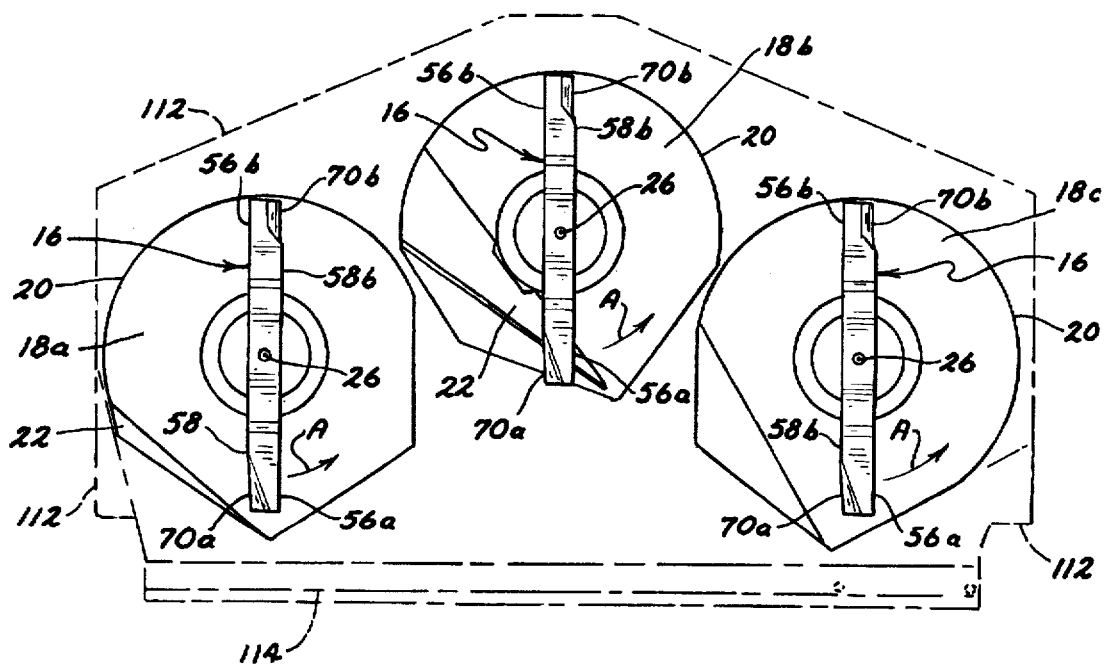
FIG. 2. is a bottom plan view of the cutting system of FIG. 1, particularly showing the rotary cutting blades and shroud means.

The cutting system 76 of the present invention further includes a plurality of side-by-side cutting blades 16 operatively driven from the traction unit 44. Each blade 16 rotates in a substantially horizontal cutting plane. Cutting blades 16 rotate in the same direction as shown by the arrows A in FIG. 2 to contact and sever standing grass at a level determined by the height of the cutting system 76 relative to the ground. Also carried under the cutting deck 105 are shroud means 20 extending downwardly from the deck 105 and defining three substantially cylindrical cutting chambers 18(a, b, and c) surrounding cutting blades 16 with one blade 16 being received in each chamber 18. As shown in FIG. 2, cutting chambers 18 extend laterally across deck 105, in a side-by-side manner. Preferably, middle cutting chamber 18b is set slightly forwardly from side cutting chambers 18a and 18c to allow the orbits of blades 16 to overlap but not intersect. This generally ensures that no uncut strips of grass ("streaks") will be left between blades 16.

Again with reference to FIG. 2, the substantially cylindrical shroud means 20 extend downwardly from the cutting deck to above the cutting blades 16. In the preferred embodiment, shrouds 20 are a steel weldment threadedly fastened to the deck 105 (not shown). Shroud means 20 could be molded or formed of a suitable alternative material, e.g., polyethylene. Each cutting chamber 18 preferably has one or more grass deflecting members or "kickers" 22 located within the cutting chamber 18 and located above radially outward portions of each blade 16. These deflecting members 22 have deflecting surfaces which are designed to direct at least some of the grass clippings downwardly into the path of the associated cutting blade 16 for eventual disposal in the cut grass path, as taught by U.S. Pat. No. 5,133,176 to Baumann, which is hereby incorporated by reference. Deflecting members 22 in the preferred embodiment are integrally formed of steel weldments into the shroud means 20, though alternatively, deflecting members 22 may formed from plastic, or the like, and may be threadedly fastened to the underside of the top wall 110 of deck 105.

Referring now to FIG. 6, a preferred cutting blade 16 of the present invention is shown in top plan view. The cutting blade 16 is generally of elongated rectangular shape including an upper or top surface 50 and a lower or bottom surface 52, a pair of outer tips 54, and together with a leading edge 56 and a trailing edge 58 extending generally parallelly spaced in relation to the leading edge 56 at a distance or blade width. A longitudinal axis 68 extends generally midway between the leading 56 and trailing edges 58 and passes through an axis of rotation 26 of the blade 16. FIGS. 4 and 5 show the cutting blade 16 in side elevational view with the longitudinal axis 68 extending out of the page.

With reference to FIG. 3 and FIG. 6, blade 16 further includes a central portion 60 and outwardly extended outer end portions 62. Central portion 60 is centered about the axis of rotation 26 and includes a mounting aperture 28 for removably attaching the blade 16 to a blade spindle (not shown). Outer end portions 62 are radially positioned from central portion 60 along the longitudinal axis 68. Each outer end portion 62 further includes a sharpened cutting surface 64 extending along the leading edge 56 radially inward from the blade tip 54. Each cutting surface 64 is approximately 6 inches long in an approximately 25 inch long blade as measured along the longitudinal axis 68. Central portion 60 and each outer end portion 62 are offset through an angled region 66. Referring to FIG. 3, the offset height of the angled region 66 is shown as 69, preferably 0.125 inch in dimension.

Still with reference to FIGS. 3 and 6, each outer end portion 62 also includes an upwardly extending surface or sail 70 formed behind the corresponding cutting surface 64. FIG. 6 is a top plan view of blade 16 such that sails 70 in effect extend up and out of the plane of the paper. Each sail 70 upwardly extends from the outer tip portion 62 of cutting blade 16 along a transition line 74.

Rectangular sail 70b includes a transition line 74b which is substantially co-linear with the longitudinal axis 68. Rectangular sail 70b includes a generally elongate rectangular sail face 84b substantially aligned with the longitudinal axis 68 along its longer dimension. With particular reference to FIG. 5, the rectangular sail portion 70b preferably generally extends from the top surface 50 of the cutting blade 16 at a radius $R_{B2}$ measured in a plane perpendicular to and intersecting the transition line 74b. Preferably, $R_{B2}$ is 1.25 inches.

Referring again to FIG. 6, triangular sail 70a includes a transition line 74a which is generally acutely angled from the longitudinal axis 68. Transition line 74a of triangular sail 70a generally extends from the outer tip 54a adjacent the cutting surface 64a to the trailing edge 58a at a preferred angle of 20 degrees, this angle being designated 82 in FIG. 6. Shown in FIG. 7, the triangular sail portion 70a is substantially formed at a uniform radius $R_{B1}$ measured in a plane perpendicular to and intersecting the transition line 74a. Preferably, the radius $R_{B1}$ is 1.5 inches. As a consequence, the triangular sail portion 70a substantially comprises a segment of a cylinder when viewed in a direction parallel to the transition line 74a. In such a sail embodiment, with the sail 70a smoothly transitioning from upper blade surface 50, the transition line 74a may thought to extend where the sail 70a initially transitions upwardly from the upper surface 50 of the cutting blade 16 (the transition line 74a contains points where the sail 70a initially extends from the top surface 50 of the cutting blade 16). With the transition line 74b of the rectangular sail 70b generally aligned with the longitudinal axis 68 and the transition line 74a of the triangular sail 70a acutely angled therefrom in the preferred manner, the transition lines 74 of this preferably embodied cutting blade 16 are substantially non-parallel.

Each sail 70 includes a sail face 84 extending from the upper surface 50 of the cutting blade 16, and generally between the transition line 74 and the trailing edge 58 of the blade 16. Sail face 84b is generally rectangularly configured and substantially aligned with the longitudinal blade axis 68. On the other hand, sail face 84a is generally triangularly configured and substantially obliquely aligned with the longitudinal blade axis 68.

Referring particularly to FIG. 3, each sail face 84 has a projected area with reference to a plane generally parallel to the longitudinal axis and perpendicular to the direction of travel (the paper plane of FIG. 3). Clearly, rectangular sail 70b has a substantially larger projected area than triangular sail 70a. The projected area of sail face 84a is approximately 1.8 square inches and the projected area of sail face 84b is approximately 2.8 square inches in the preferred embodiment. The projected areas of this preferred cutting blade 16 differ by approximately 55%. The projected areas (as in FIG. 3) of a preferred cutting blade 16 of this invention comprising dissimilarly shaped sail portions 70 should differ by at least approximately 20%.

Rectangular sail portion 70b of the preferred cutting blade 16 is configured as sails incorporated in Toro blade no. 86-0010, while triangular sail portion 70a is similar to Toro blade no. 85-6040. It has been found that mowing operations with such a prior art rectangular sail blade may be characterized with a higher quality of cut (fewer stragglers of uncut grass) and better dispersion of grass clippings, though having greater streaking potential, as compared to the triangular sail blade.

Applicant has tested a preferred blade 16 and has found that the benefits associated with the blade 16 combining both rectangular 74b and triangular 74a configured sails may include improvements in quality of cut and dispersion of clippings, along with reduced streaking. It was also found that a preferred blade 16 in operation may realize improvements in noise reduction and tonal quality. Furthermore, it is also believed that a preferred blade may yield improvements in overall mower efficiency by minimizing blade 16 air drag.

Rotary cutting blades 16 may also be characterized by the interaction of the blade sail 70 with grass clippings within the mower housing 105. It is regarded that rotary cutting blades 16 having rectangularly shaped sails 70b with sail faces 84b aligned with the longitudinal blade axis 68 generally impart greater tangential forces to subject grass clippings than triangularly shaped sails 70a having sail faces 84a obliquely aligned with the longitudinal blade axis 68. It is believed that in operation the rotary blade 16 of the present invention, including both a rectangular and triangular shaped sail (70b, 70a), imparts, on average, substantially greater tangential forces to grass clippings influenced by the rectangular sail 70b as compared to the clippings associated with the triangular sail 70a.

Referring to FIG. 6, a preferred cutting blade 16 according to this invention is approximately 25 inches in length, measured along the longitudinal axis 68. Blade 16 width is approximately 2.5 inches. Angled regions 66 of the preferred blade 16 are approximately 6.75 inches radially inward from associated blade tips 54. With reference to FIG. 6, the projected widths of triangular and rectangular blade sails (70a, 70b) measured at the outer blade tips 54 are approximately 1.55 inches and 0.98 inch, respectively. The lengths of triangular and rectangular blade sails (70a, 70b), measured along the longitudinal axis 68 in FIG. 6 are approximately 5, and 4.25 inches, respectively.

Rotary cutting blades 16 may also be characterized by the interaction of the blade sail 70 with grass clippings within the mower housing 105. It is regarded that rotary cutting blades 16 having rectangularly shaped sails 70b with sail faces 84b aligned with the longitudinal blade axis 68 generally impart greater tangential forces to subject grass clippings than triangularly shaped sails 70a having sail faces 84a obliquely aligned with the longitudinal blade axis 68. It is believed that in operation the rotary blade 16 of the present invention, including both a rectangular and triangular shaped sail (70b, 70a), imparts, on average, substantially greater tangential forces to grass clippings influenced by the rectangular sail 70b as compared to the clippings associated with the triangular sail 70a. A preferred blade 16 comprising a leading edge 66 having a sharpened cutting surface 64 for generating grass clippings and a trailward airfoil portion 70 extending therefrom for pneumatically suspending and transporting grass clippings is believed to impart grass clippings associated with the first tip portion 62 with an average tangential velocity (with respect to the blade 16 orbit) which is substantially different than the average tangential velocity of clippings associated with the second tip portion 62. In a preferred cutting blade 16 comprising rectangular and triangular sails (70b, 70a) at the tip portions (62b, 62a) the grass clippings associated with the rectangular sail 70b were observed to have substantially larger average tangential velocities as compared to clippings associated with opposite triangular sail (70a).

Referring to FIGS. 4 and 5, sail heights 72 measured from the lower edge of the cutting surface 64 to the top of each sail are approximately 1.1 inches.

Blade 16 is preferably manufactured in any appropriate manner from a rigid metallic material such as steel. A preferred blade may be manufactured of hot rolled steel austempered to hardness RC 38–44, with approximately 0.25 inch thickness. Alternatively, blade 16 could be integrally cast or molded from a form having the requisite shape therein.

There are other modifications which will be apparent to those skilled in the art. Accordingly, the scope of this invention will be limited only by the appended claims.

I claim:

1. A mower blade for cutting ground vegetation which is edgewise rotatable about a center of rotation, said cutting blade comprising:

a central portion and first and second outer end portions substantially equally spaced from the central portion, each outer end portion comprising (i) a leading edge including a sharpened cutting surface for cutting the vegetation, (ii) a trailing edge, and (iii) a sail member having a sail surface upwardly extending away from a generally horizontal plane containing the cutting surface, wherein the sail member of the first outer end portion and the sail member of the second outer end portion are differently configured from one another, and wherein the mower blade is not rotationally symmetrical about the center of rotation.

2. A lawn mower for cutting ground vegetation, said lawn mower comprising:

a cutting blade having an axis of rotation and a direction of rotation, said cutting blade having a central portion and first and second outer end portions and a longitudinal axis extending lengthwise between the outer end portions, the first and second outer end portions being substantially equally spaced from the central portion along the longitudinal axis, each outer end portion comprising (i) a leading edge including a sharpened cutting surface for cutting the vegetation, (ii) a trailing edge, and (iii) a sail member, each sail member having a sail surface extending upwardly away from a generally horizontal plane containing its associated cutting surface, each sail surface having a projected area with reference to a plane generally parallel to the longitudinal axis and generally perpendicular to the direction of rotation, and the projected area of the first sail member is substantially larger than the projected area of the second sail member, wherein said cutting blade is not rotationally symmetrical about said axis of rotation.

3. A mower according to claim 2, wherein the projected area of the first sail member is at least about 20% larger that the projected area of the second sail member.

4. A mower according to claim 2, wherein the projected area of the first sail member is approximately 55% larger than the projected area of the second sail member.

5. A lawn mower for cutting ground vegetation, said lawn mower comprising:

a rotatable cutting blade, said cutting blade having a central portion and substantially equally spaced apart outer end portions and a longitudinal axis extending lengthwise between the outer end portions, each outer end portion comprising (i) a leading edge including a sharpened cutting surface for cutting the vegetation, (ii) a trailing edge, and (iii) a sail member having a sail surface, said sail surface generally upwardly extending along a transition line away from a generally horizontal plane containing its associated cutting surface, wherein the transition lines are generally non-parallel, and wherein said cutting blade is not rotationally symmetrical.

6. A mower according to claim 5, wherein the sail surface of the first outer end portion generally upwardly extends along a transition line which is substantially parallel with the longitudinal axis, and wherein the surface of the second outer end portion generally upawardly extends along a transition line which is obliquely angled with respect to the longitudinal axis.

7. A mower according to claim 6, wherein the oblique transition line of the second outer end portion is approximately angled at 20 degrees with respect to the longitudinal axis.

8. An elongated mower blade of a predetermined length having top and bottom surfaces, generally parallel longitudinal edges, and opposite end edges, said blade being edgewise rotatable in one direction inside a mower housing about an axis of rotation concentric to the center of the blade, said end edges being substantially equally spaced from the axis of rotation, said blade comprising:

first and second leading edges each sufficiently sharp along a portion of the length to provide a cutting surface, the mower blade further having first and second upwardly inclined sail members respectively behind the first and second leading edges, the first and second sail members each having a sail surface extending upwardly away from the top surface and each sail member being substantially distinctly configured such that first and second sail member cross-sectional profiles taken along transverse cross-sectional planes which are radially equidistant from the axis of rotation and generally perpendicular to the longitudinal edges are generally dissimilar as one moves radially outwardly along the mower blade, wherein the mower blade is not rotationally symmetrical about its axis of rotation.

9. A lawn mower for cutting ground vegetation, said lawn mower comprising:

a rotatable cutting element which is edgewise rotatable about a center of rotation, the cutting element having a central portion and a plurality of radially spaced apart outer end portions, each outer end portion being substantially equally radially spaced from the center of rotation, each outer end portion includes a corresponding sail member, each sail member having a sail surface extending upwardly away from a generally horizontal plane containing its associated cutting surface, wherein the sail members of at least two outer end portions are differently configured, and wherein said cutting element is not rotationally symmetrical about its center of rotation.

10. A mower for cutting ground vegetation, said mower comprising:

a cutting blade which is rotatable about a substantially vertical axis of rotation; and a cutting housing within which the cutting blade is positioned, the cutting blade having a central portion and substantially equally radially spaced apart outer end portions, each outer end portion including a leading and a trailing edge taken with reference to a forward direction of rotation of the blade, the leading edge of each outer end portion having a sharpened cutting surface creating vegetation clippings during operation, each outer end portion further including a sail member for pneumatic and mechanical influence of clippings associated with each tip portion, each sail member having a sail surface upwardly extending away from a top surface of the cutting blade, wherein the sail members of at least two outer end portions have different shapes, and wherein the cutting blade is not rotationally symmetric about its axis of rotation.

11. A lawn mower for cutting ground vegetation, the lawn mower comprising:

a rotatable cutting blade, said cutting blade having a central portion, a top surface, and first and second outer end portions substantially equally radially spaced apart along a longitudinal blade axis, each outer end portion comprising (i) a leading edge, (ii) a trailing edge, and (iii) an extending sail member having a sail surface generally upwardly extending away from the top surface along a transition line, the transition line of the sail member of the first outer end portion being generally aligned with the longitudinal axis such that the sail surface is generally rectangularly configured and substantially parallelly aligned with the longitudinal axis, and the transition line of the sail member of the second outer end portion being generally obliquely aligned with respect to the longitudinal axis at approximately 20 degrees such that the sail surface of the second outer end portion is generally triangularly configured being substantially obliquely aligned with the longitudinal axis, wherein said cutting blade is not rotationally symmetric about its center.

* * * * *